United States Patent Office 2,716,680
Patented Aug. 30, 1955

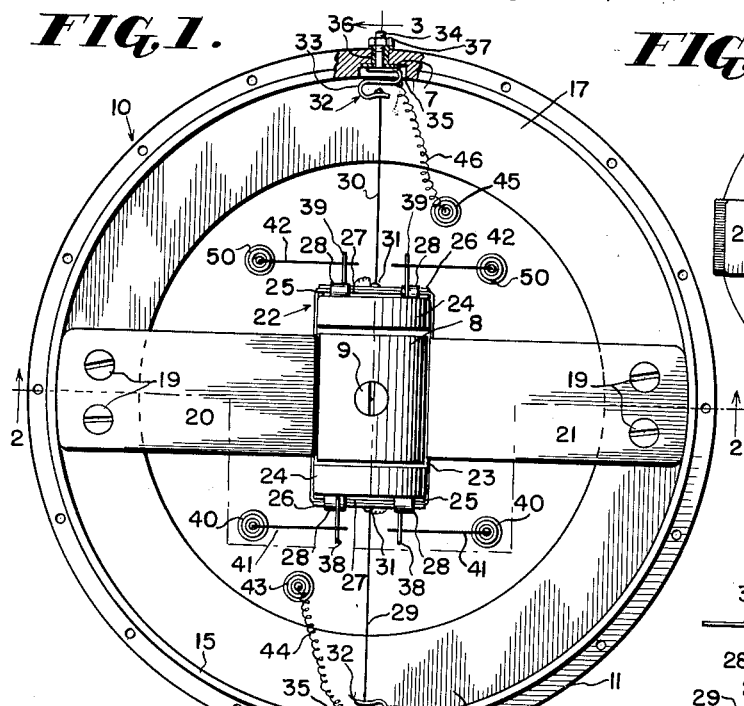

2,716,680

GALVANOMETER RELAY

David S. Muzzey, Jr., Washington, D. C.

Application April 11, 1950, Serial No. 155,315

6 Claims. (Cl. 200—110)

(Granted under Title 35, U. S. Code (1952), sec. 266)

This invention relates to a relay and more particularly to a galvanometer relay adapted for use in connection with a submarine mine, or the like, wherein a highly sensitive relay has been devised without sacrificing ruggedness or making the instrument sensitive to orientation.

Accordingly, the relay of the present invention is particularly well adapted for use in an induction type mine employing the usual search coil arrangement, the relay being sufficiently rugged to withstand rough use to which it may be subjected during handling, transportation, and planting of the mine within a body of water, and also sufficiently sensitive to operate in response to an electrical signal having the strength of less than one microampere thereby increasing the sensitivity of the mine firing mechanism such, for example, as the type of arming and firing circuit for an induction type marine mine as disclosed and claimed in the copending application of Richard J. Burke et al. for an Induction Ground Mine and Firing Mechanism Therefor, Serial No. 548,484, filed August 7, 1944.

Furthermore, the present invention provides a relay employing a movable coil structure suspended by a pair of fine taut wires within a casing completely filled with a liquid of low viscosity, the liquid surrounding the coil structure and contact members thereof such that the buoyancy of the coil structure cancels its weight and the center of buoyancy is at the center of the mass of the coil structure whereupon gravitational forces due to high accelerations exert no force on the wire suspension means. Furthermore, the invention comprises means for suspending and floating a movable coil within a hermetically sealed casing at neutral buoyancy whereupon the movement thereof is controlled by the aforesaid fine wire suspension means but due to the fact that the moving coil structure is completely submerged in a liquid of low viscosity at neutral buoyancy there will be no stress on the suspension means due to gravity and thus the balance and sensitivity will not be changed by orientation of the relay. However, with the casing completely filled with the liquid and the moving coil structure suspended and maintained at neutral buoyancy therein, as heretofore described, the casing for enclosing the moving coil and component parts thereof may be composed of any material suitable for the purpose and of sufficient strength and thickness to withstand severe shocks to which the device may be subjected during handling, transportation and in service without affecting the sensitivity of the device for the reasons that there will be no more displacement of the aforesaid moving parts than there is displacement of the walls defining the casing enclosing such parts. Thus by the aforesaid arrangement it is possible to employ a very fine taut wire suspension means for a movable coil structure enclosed within a relatively thick casing without sacrificing ruggedness or causing the relay to be sensitive to orientation.

An object of the invention is to provide a new and improved galvanometer relay comprising a movable coil structure suspended within a hermetically sealed casing in such a manner that gravitational forces and inertia forces due to high acceleration exert negligible force on the suspension means therefor.

Another object is the provision of a new and improved highly sensitive relay in which means are provided for preventing gravitational forces and inertia forces due to high accelerations from exerting any force on the movable and floating coil suspension means.

A still further object of the invention is the provision of a new and improved relay of rugged construction having high sensitivity characteristics and which will be economical to manufacture and possesses the desired qualities of reliability and efficiency in use and operation.

Other objects and many of the attendant advantages of this invention will be readily appreciated as the same becomes better understood by reference to the following detailed description when considered in connection with the accompanying drawings wherein:

Fig. 1 is a plan view of the device of the present invention with the cover plate removed therefrom;

Fig. 2 is a sectional view of the device taken on the line 2—2 of Fig. 1;

Fig. 3 is a sectional view taken on the line 3—3 of Fig. 1;

Fig. 4 is an enlarged end elevational view of the movable coil structure; and

Fig. 5 is a fragmentary sectional view taken on the line 5—5 of Fig. 4.

Referring to the accompanying drawings wherein like numerals of reference are employed to designate like parts throughout the several views, and more particularly to Fig. 1, the numeral 10 designates generally the galvanometer relay. The relay comprises a casing 11 composed of any material suitable for the purpose such, for example, as aluminum, brass or any other non-magnetic material. Secured to the casing 11 as by screws or the like 12 is a cover plate 13, a gasket 14 composed of rubber or any other suitable material being disposed within an annular recess formed in the cover plate and in sealing engagement with an annular rib 15 formed on the casing 11. By this arrangement a water-tight joint is provided between the cover and the casing and the component parts of the relay are hermetically sealed therein and submerged in a liquid having low viscosity characteristics and indicated by the reference numeral 16, the casing being completely filled with the aforesaid liquid, as best seen in Figs. 2 and 3, this condition being effected and maintained by the bellows 6.

As most clearly shown in Fig. 1 a permanent magnet is arranged within the casing 11 and comprises a pair of semi-circular magnets 17 and 18 having the end portions thereof in abutting engagement with respect to each other and a pair of oppositely disposed pole pieces 20 and 21, the magnets 17 and 18 being secured to the casing 11 and the pole pieces 20 and 21 being secured to the aforesaid abutting end portions of the magnets as by screws 19. Disposed between and in spaced relation with respect to the pole pieces 20 and 21 is a cylindrical iron core 8, the core being secured to the casing 11 as by a screw 9.

Arranged within the aforesaid liquid at neutral buoyancy is a movable coil form or structure generally indicated by the reference character 22. The coil structure comprises a substantially rectangularly shaped coil of wire 23, disposed about and in spaced relation with respect to the core 8 and also in spaced relation with respect to the pole pieces 20 and 21. Disposed within the coil 23 and arranged at the ends thereof respectively is a pair of floats 24. The coil is secured to the floats in any suitable manner but preferably by a pair of plates 25 respectively secured to the floats as by joining the parts together in any suitable manner and a pair of complementary plates 26 adapted to coact with the plates 25, whereupon the end portions 27 of the coil are clamped between the plates 25 and 26 by a plurality of tabs 28 formed on each plate 25 and disposed in clamping engagement with the plates 26. By the aforesaid arrangement and as more clearly shown on Figs. 4 and 5, the plates 25 are secured to the floats and the portions 27 of the coil are clamped between the plates 25 and 26.

Secured to each support or plate 26 and extending outwardly therefrom, Figs. 1 and 3, is a pair of relatively fine suspension wires 29 and 30. One end of each wire is suitably secured to the plates 26 respectively as at 31, the other ends thereof being secured to a pair of oppositely disposed spring clips 32 in any suitable manner such, for example, as by soldering the parts together. Wires 29 and 30 may be electrically insulated from the coil supporting structure in any suitable manner such, for example, as by forming plate 26 of non-conducting material, the ends of coil 23 being brought through suitable openings in the plates 26 and secured to wires 29 and 30 at 31 as best seen in Figs. 2 and 4.

Each clip 32 is provided with a substantially S-shaped spring portion 33 having secured thereto as by soldering the parts together a threaded shank 34 whereby the clips are secured to the casing 11. As shown more clearly on Figs. 1 and 3, each clip is seated within one of a pair of oppositely disposed recesses 35 formed in the casing 11, the shank portion 34 of each clip extending through a suitable sealing gasket 7 and an insulating bushing 36 bordering on the aforesaid recesses and having threaded engagement with a nut 37. By this arrangement the clips 32 are secured to the casing but insulated therefrom electrically and clamped within the aforesaid recesses in such a manner as to prevent rotation thereof and also to seal the liquid 16 within the casing.

Each float 24 has secured thereto, electrically connected thereby, and extending outwardly therefrom a pair of spaced contacts 38 and 39 respectively, the contacts 38 being adapted to be brought into engagement with a pair of spaced contacts 41 supported by a pair of terminals 40 respectively when the coil structure is moved in one direction in response to a signal passing through the coil, the contacts 39 being adapted to be moved into engagement with a pair of spaced contacts 42 supported by a pair of terminals 50 respectively when the coil structure is moved in the other direction as the signal passes through the coil in the reverse direction. It will be understood, however, that the signal is conducted to one side of the moving coil 23 from a suitable source (not shown) such, for example, as a search coil by way of terminal 43, conductor 44, spring clip 32, suspension wire 29, and thence to the coil, the signal being conducted to the other side of the moving coil from the aforesaid search coil by way of terminal 45, conductor 46, spring clip 32, suspension wire 30 and thence to the moving coil. From the foregoing, it will be understood, then, when the coil is energized and the current flows therethrough the coil structure will be moved in one direction, and when the current flows therethrough in the reverse direction the coil structure will be moved in the other direction whereupon the contacts 38—41 and 39—42 are selectively brought into and out of engagement.

The terminals 40, 43, 45 and 50 may be secured and sealed to and electrically insulated from the casing 11 in any suitable manner such, for example, as indicated generally at 47, such an arrangement being also adapted to provide means whereby an external electrical connection may be attached thereto.

Briefly stated in summary, the present invention provides a new and improved highly sensitive relay particularly adapted for use in a mine firing system adapted to be controlled by a plurality of changes in the magnetic field received within predetermined intervals of time in which a predetermined number of such changes are required to fire the mine as a vessel moves within the vicinity thereof. The improved relay also provides new and novel means for floating a moving coil at neutral buoyancy, the movement thereof being controlled by a pair of fine taut wire suspension means, but in view of the fact that the moving coil structure is completely submerged in a liquid of very low viscosity at neutral buoyancy there will be no stress on the aforesaid suspension means due to gravity and the balance and sensitivity of the relay will not be changed by orientation thereof. Furthermore, upon impulsive shock and with the casing of the relay completely filled with the liquid and the moving components thereof maintained at neutral buoyancy there will be no more displacement of the moving components than there is displacement of the walls of the casing, whereupon the casing may be composed of relative thick and rugged material without affecting the sensitivity of the instrument. By the aforesaid construction and arrangement a highly sensitive relay has been devised wherein a very fine and not too stiff suspension means is employed for supporting the moving coil without sacrificing ruggedness or making the instrument sensitive to orientation.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. A highly sensitive relay of the character disclosed comprising a casing, a movable coil form suspended within said casing and constructed and arranged to be rotated as a current passes therethrough, a pair of spring clips secured to the casing, a pair of fine wires secured to said form and said clips respectively for rotatably supporting and supplying restoring torque to the coil as the coil is rotated, a quantity of liquid of low viscosity disposed within and completely filling said casing, and a pair of mutually spaced hollow floats forming a part of said coil form and secured on opposite ends thereof and to said wires respectively for floating said coil at neutral buoyancy within the liquid and for minimizing the gravitational and inertia forces on the wires due to high acceleration.

2. A highly sensitive relay of the character disclosed adapted to be operated by signals of opposite polarity comprising a casing, a quantity of liquid disposed within and completely filling said casing, a movable coil form arranged within said casing and constructed and arranged to be rotated as a current passes therethrough, a pair of spring clips secured to said casing, a pair of delicate wires secured to said form and said clips respectively for rotatably supporting the coil within said liquid, a pair of mutually spaced hollow floats forming a part of said form secured to said form and wires respectively for maintaining the coil at neutral buoyancy within the liquid whereby the stress applied to said delicate wires in response to gravity or inertia forces is negligible and the balance and sensitivity of the relay is not affected by orientation thereof.

3. A highly sensitive galvanometer relay having a core and a coil form disposed thereabout for rotative movement with respect thereto as the coil is energized and comprising a casing, a quantity of liquid of low viscosity disposed within and completely filling said casing, a pair of spring clips secured to said casing, a pair of delicate wires secured to said form and to the clips respectively for rotatably supporting the coil within the casing and submerged within said liquid, a pair of mutually spaced hollow floats forming a part of said form and secured to said form and said pair of wires respectively and completely submerged in said liquid for maintaining the coil at neutral buoyancy within the liquid whereby the stress applied to said delicate wires due to gravity or inertia forces is negligible and the balance and sensitivity of the relay will not be affected by orientation thereof, a pair of contact elements secured to each of said floats for movement therewith as the coil is energized, and two pairs of spaced contacts secured to each casing in alignment respectively with said pairs of said movable contact elements and adapted to be engaged selectively thereby as the coil moves from an initial position to a moved position in response to signal currents of opposite polarity.

4. A galvanometer relay of the character disclosed adapted to be operated by signals of opposite polarity and comprising a sealed casing, a pair of mutually spaced hollow floats having a coil mounted thereon for rotation from an initial position to a moved position as an electrical current is passed through said coil, means including a pair of fine wires secured to said casing and floats respectively for rotatably supporting and supplying restoring torque to said floats sufficient to move the floats and coil from said moved position to said initial position, and a quantity of liquid disposed within and completely filling the casing for supporting the coil at neutral buoyancy within the casing and for minimizing the gravitational and inertia forces on said fine wires due to high acceleration.

5. A galvanometer relay of the character disclosed adapted to be operated by signals of opposite polarity and comprising a sealed casing, a coil form having a pair of mutually spaced buoyant hollow floats supporting said form and encompassed thereby for rotation from an initial position to a moved position as an electrical current is passed through the coil, means carried by said floats for securing said form to the floats, means including a pair of fine wires secured to said casing and floats respectively for rotatably supporting and supplying restoring torque to said floats sufficient to move the floats and coil from said moved position to said initial position, and a quantity of liquid disposed within the casing for supporting the coil at neutral buoyancy within said casing.

6. A galvanometer relay of the character disclosed adapted to be operated by signals of opposite polarity and comprising a sealed casing, a coil assembly including a pair of mutually spaced hollow floats for imparting neutral buoyancy to the coil, said coil surrounding said floats and secured thereto, a pair of clamping plates carried by each of said floats and having a portion of the coil clamped therebetween for securing the coil to the respective float, means secured to the casing and plates respectively for rotatably supporting said floats and coil within the casing, and a copious quantity of liquid disposed within the casing sufficient to cover said floats.

References Cited in the file of this patent

UNITED STATES PATENTS

| | | |
|---|---|---|
| 1,927,346 | Lawrence | Sept. 19, 1933 |
| 2,573,000 | Fischer | Oct. 30, 1951 |

FOREIGN PATENTS

| | | |
|---|---|---|
| 170,117 | Great Britain | Oct. 17, 1921 |
| 566,106 | Great Britain | Dec. 13, 1944 |
| 606,521 | Great Britain | Aug. 16, 1948 |
| 887,633 | France | Aug. 16, 1943 |